Figure 1:
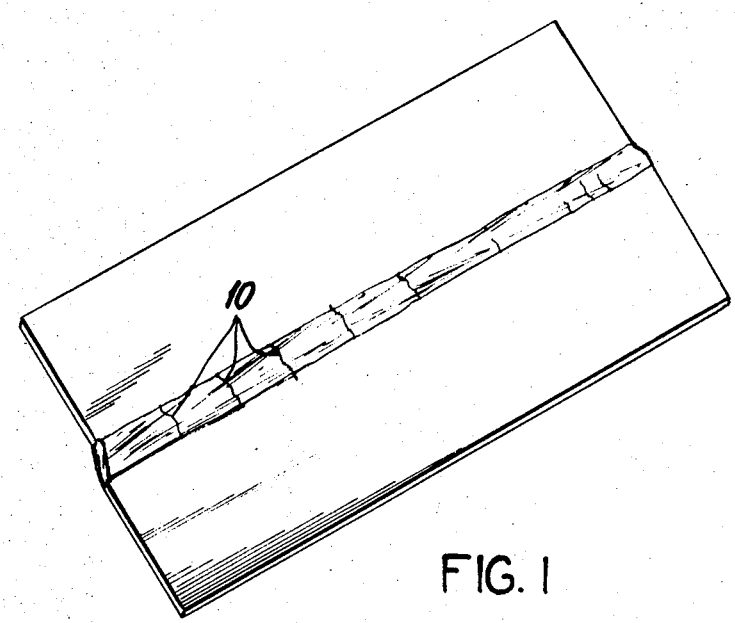

United States Patent

[11] 3,617,685

[72] Inventors Harry W. Brill-Edwards
 New York;
 Fereidoon Zahabi, Nyack, both of N.Y.
[21] Appl. No. 65,063
[22] Filed Aug. 19, 1970
[45] Patented Nov. 2, 1971
[73] Assignee Chromalloy American Corporation
 Orangeburg, N.Y.

[54] METHOD OF PRODUCING CRACK-FREE ELECTRON BEAM WELDS OF JET ENGINE COMPONENTS
 8 Claims, 2 Drawing Figs.
[52] U.S. Cl.................................................... 219/121 EB,
  29/504, 75/171, 219/118
[51] Int. Cl..................................................... B23k 15/00
[50] Field of Search........................................... 219/118,
  118.1, 118.2, 121 EB, 121, 146; 29/504, 366;
  75/171

[56] References Cited
 UNITED STATES PATENTS
| 2,054,770 | 9/1936 | Kautz | 219/10 |
| 2,664,622 | 1/1954 | Spitz | 29/366 |
| 2,985,747 | 5/1961 | Kutchera | 219/118 |
| 3,094,414 | 6/1963 | Franklin | 75/171 |
| 3,310,399 | 3/1967 | Baldwin | 75/171 |
| 3,391,033 | 7/1968 | Chevigny et al. | 219/118 |
| 3,398,256 | 7/1968 | Foley | 219/146 |

OTHER REFERENCES

H. Hokanson, W. I. Kern; " Electron Beam Welding of Tungsten and Molybdenum;" Dec. 1961 (by Hamilton-Standard) pages 15–30.

W. I. Kern; "Electron Beam Welding of Bi-Metal Trubine Wheels" June, 1962 (by Hamilton-Standard) pages 1– 4.

Primary Examiner—J. V. Truhe
Assistant Examiner—O'Neill
Attorney—Sandoe, Hopgood and Calimafde ABSTRACT: Crack-free welds of jet engine components formed essentially of a heat resistant nickel-base alloy having a tendency to be weld-crack sensitive are produced by abutting selected surface of at least a pair of structural elements of said nickel-base alloy, the elements being assembled in welding relationship with an iron-base shim therebetween, the elements being electron beam welded together into a unitary structure by melting the iron-base shim at the interface of the abutting surfaces, whereby the resulting weld which is an alloy of the iron-base shim and the nickel-base alloy is crack-free.

PATENTED NOV 2 1971 3,617,685

INVENTORS
HARRY W. BRILL-EDWARDS
BY FEREIDOON ZAHABI

Sandoe, Hopgood & Calimafde
ATTORNEYS

METHOD OF PRODUCING CRACK-FREE ELECTRON BEAM WELDS OF JET ENGINE COMPONENTS

This invention relates to a method of producing crack-free electron beam welds by the electron beam welding of at least a pair of heat resistant structural elements consisting essentially of a nickel-base alloy having a tendency of being weld-crack sensitive and, in particular, to the production of crack-free welds in the welding of jet engine components.

Jet engine structural elements or components, e.g. turbine blades, guide vanes, and the like, are generally made of nickel-base alloys consisting essentially of substantial amounts of chromium, molybdenum, tantalum, cobalt, titanium, aluminum and other elements, which alloys are characterized by exhibiting high strength at elevated temperatures and of being highly hot corrosion and erosion resistant at temperatures encountered in jet engines, for example, at temperatures in the range of about 1,700° to 2,200° F. These alloys must have relatively high tensile strength at the operating temperatures, and exhibit, as well, a high degree of resistance to high-temperature creep.

In producing jet engine components from nickel-base superalloys, it is not uncommon to weld together structural heat-resistant elements into subassemblies and then combine the welded subassemblies into larger structural units. The welding together of heat-resistant elements may include, for example, the welding of an airfoil section to one or more buttresses, the gang welding together of several guide vanes into subassemblies preparatory to mounting the subassemblies into vane shroud rings, and the welding of the structural elements which in use are subjected to high temperature corrosion and/or erosion. A nickel-base superalloy found to be particularly desirable and which has recently been introduced for the production of turbine blades, guide vanes, and the like, is one containing nominally about 8% Cr, about 10% Co, about 6% Mo, about 6% Al, about 4.3% Ta, about 1% Ti, about 0.015% B, about 0.08% Zr, with or without about 1% to 1.5% Hf, and the balance essentially nickel. This is a gamma prime hardened alloy. Broadly speaking, the alloy may range from about 5% to 12% Cr, about 3% to 8% Mo, about 2.3% to 10% Ta, the combined Mo and Ta content ranging from about 5% to 14%, about 5% to 15.5% Co, up to about 7% Ti, up to about 8% Al, the combined Ti and Al content ranging from about 5% to 9%, up to about 0.3% C, up to about 0.05% B, up to about 1% Zr, up to about 2% Hf, up to about 2% Fe and the balance essentially nickel.

Preferred composition ranges found particularly useful include (A) about 7.5% to 12% Cr, about 3% to 8% Mo, about 2.3% to 10% Ta, the combined Mo and Ta content ranging from about 7% to 13%, about 5% to 10.5% Co, up to about 2.5% Ti, about 5% to 7% Al, the combined Ti and Al content ranging from about 5.5% to 8%, up to about 0.2% C, up to about 0.05% B, up to about 1% Zr, up to about 2% Hf, up to about 2% Fe and the balance essentially nickel and (B) about 7.5% to 8.5% Cr, about 5.75% to 6.25% Mo, about 4% to 4.5% Ta, about 9.5% to 10.5% Co, about 0.8% to 1.2% Ti, about 5.75% to 6.25% Al, about 0.08% to 0.15% C, about 0.01% to 0.02% B, about 0.05% to 0.1% Zr, up to about 0.5% Fe, about 0.1% to 2% Hf and the balance nickel.

In alloys of the aforementioned types, the presence of titanium, zirconium and aluminum, among others, is known to make such alloys weld-crack sensitive. This is particularly true under conditions of welding in which the weld is subjected to rapid cooling due to the nature of the weld, such as is characteristic of welds obtained by electron beam welding.

It has recently been observed that this problem is even further aggravated when such alloys also contain hafnium in effective amounts, such as from about 0.1% to 2%, for example 1 to 1.5% or 2%.

The alloys referred to hereinabove and, in particular, composition (B) and the nominal composition are difficult to cast (e.g. investment casting of guide vanes) due to the tendency of such alloys to form shrinkage cracks on cooling from the molten phase. Such alloys as the foregoing exhibit a wide solidification temperature band and during cooling are subject to cracking. Thus, extreme caution must be taken when producing structural elements or components for jet engines by investment casting to assure a crack and shrinkage-free product. Because of the foregoing characteristics of the nickel-base alloys referred to, structural elements of such alloys tend to crack, and, in many instances, quite severely, at the weld when electron beam welded to form subassemblies. This is due to the fact that when the structural element is subjected to electron beam welding, the welding zone is characteristically narrow and cools rapidly due to the heat sink propensity of the substantially unheated base metal adjacent the weld. Since the alloy has a wide solidification temperature band, the excessively high cooling rate at the weld leads to cracking transverse to the welding direction. This was particularly true in the case of welding second stage vanes into triplet assemblies (that is, three vanes electron beam welded together at their platform faces) for use in recently designed high thrust jet engines.

Attempts were made to overcome this problem by inserting nickel-base alloy shims (0.002 to 0.020 inch thick) between the contact faces to be welded on the theory that those nickel alloys not subject to welding cracks would avoid or prevent the weld cracking of the base metal. Shim materials used and which were unsuccessful included nickel foil, IN-600 (0.04% C, 15.8% Cr, 7.2% Fe, 0.2% Mn, 0.2% Si and the balance nickel), Hastelloy X (0.15% C, 22% Cr, 9% Mo, 20% Fe and the balance nickel), Hastelloy W (24% Mo, 5% Cr, 5% Fe and the balance essentially Ni), and the like. Other attempts to use nickel-base shim material failed to overcome the problem.

It is thus the object of the invention to provide a method of electron beam welding structural elements of a specified nickel-base alloy while avoiding cracking at the weld.

Another object is to provide a method of electron beam welding jet engine components of a particular nickel-base alloy into a desired assembly characterized by crack-free welds.

Figure 2:
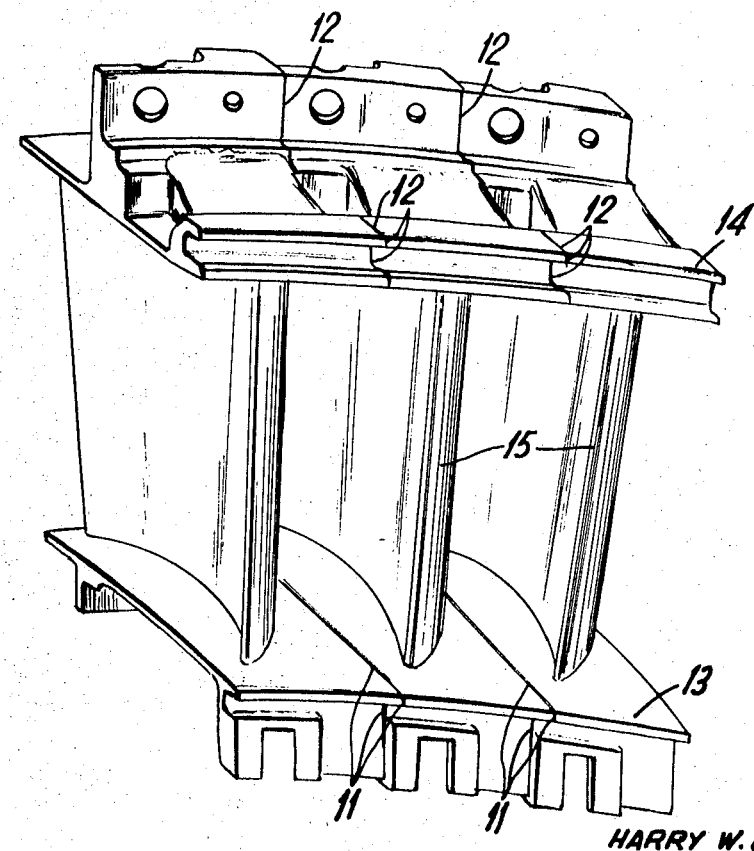

These and other objects will more clearly appear when taken in conjunction with the following disclosure and the accompanying drawing, wherein:

FIG. 1 shows two elements or members of a particular nickel-base alloy electron beam welded without the use of a shim, the weld being characterized by cracks transverse to the weld direction; and FIG. 2 is a triplet assembly of three second stage vanes electron beam welded at their platform faces as shown.

Stating it broadly, the invention is directed to method of producing crack-free welds by electron beam welding of at least a pair of heat-resistant structural elements consisting essentially of a heat-resistant nickel-base alloy containing by weight about 5% to 12% Cr, about 3% to 8% Mo, about 2.3% to 10% Ta, the combined Mo and Ta content ranging from about 5% to 14%, about 5% to 15.5% Co, up to about 7% Ti, up to about 8% Al, the combined Ti and Al content ranging from about 5% to 9%, up to about 0.3% C, up to about 0.05% B, up to about 1% Zr, up to about 2% Hf, up to about 2% Fe and the balance essentially nickel. The method comprises providing at least one pair of structural elements of the foregoing nickel-base alloy, assembling the elements with selected surfaces thereof in abutting welding relationship with an iron-base shim disposed between the abutting surfaces, and then electron beam welding the elements into a unitary structure along their contacting surfaces by the electron beam melting of the iron-base shim at the abutting surfaces of said elements, the resulting weld being crack-free and comprising an alloy of the nickel-base structural elements and the iron-base material.

It has been found that by employing an iron-base shim in producing the weld, that is, an iron-base material containing at least about 70% iron, more preferably at least about 95% iron, and advantageously not exceeding about 0.15% in carbon content, cracks are avoided in the resulting narrow weld zone, despite the high cooling rate characteristic of welds produced by electron beam welding. Examples of iron-base materials are Armco iron (otherwise known as open hearth ingot iron containing 99.75% iron, some manganese, silicon, and less than 0.1% C), low carbon steels containing 0.05% to 0.15% C and the balance essentially iron, 304 stainless steel (18%-20% Cr, 8%-12% Ni, 0.08% C max, 1% Si max, 2% Mn max and the balance iron), 410 stainless steel (11.5%-13.5% Cr, 0.5%14 0.15% C max, 1% Si max, 1% Mn max, and the balance iron). The carbon in the iron-base material should be as low as is practicable and preferably not exceed about 0.15% in order to minimize the formation of carbides at the weld by reaction with carbide formers, such as Cr, Mo, Ti, Ta, etc. in the nickel-base alloy substrate. Excessive carbide formation can cause weld imbrittlement. As stated hereinbefore, we have found it advantageous to use iron-base shims containing at least 95% iron and carbon below 0.15% and, more preferably, not exceeding about 0.1% carbon. Examples of low carbon iron or steel containing at least about 95% iron are as follows: SAE 1006 (0.08% C max), SAE 1008 (0.1% C max), SAE 1009 (0.15% C max), SAE 1010 (0.08-0.013% C), SAE 1012 (0.1 to 0.15% C) and the like. Steels containing at least 95% iron or even at least 98% iron may contain optionally small amounts of other elements, such as Mn, Si, Ni, Cr, etc. We have found it advantageous to use the aforementioned low carbon steels in preference to stainless steels in that a wider range of welding parameters can be employed in producing crack-free welds.

The invention is particularly applicable to the welding of alloys having the compositions (A) and (B) described hereinbefore and, in particular, the nominal composition comprising essentially about 8% Cr, about 10% Co, about 6% Mo, about 6% Al, about 4.3% Ta, about 1% Ti, about 0.015% B, about 0.08% Zr, about 1% to 1.5% Hf and the balance essentially nickel.

As stated herein, attempts at using nickel-base shims of, for example, nickel foil or IN-600 alloy did not prevent weld cracking of the aforementioned nominal composition. Severe cracks were obtained when the same alloy material was welded without a shim as shown in FIG. 1. It might be mentioned that welding of other nickel-base superalloys, such as Udimet 700 (0.08% C, 15.0% Cr, 18.5% Co, 5.2% Mo, 3.5% Ti, 4.3% Al, 0.03% B and the balance nickel), under comparable conditions with or without a shim exhibited crack-free welds. It is thus apparent that the cracking phenomenon is characteristic of the alloys of the type referred to in FIG. 1.

However, when a cold-rolled steel shim containing 0.08 to 0.13% carbon, 0.3 to 0.6% Mn, 0.04% max P, 0.05% max S and the balance iron was used in welding the nominal composition, completely crack-free electron beam welds were obtained. FIG. 2 is illustrative of three turbine vanes made of the nominal composition containing about 1 to 1.5% Hf electron beam welded at their contacted platform faces 11 and 12 into a triplet assembly using a low carbon steel shim. In general, a steel shim at least 2 mils (0.002 inch) in thickness will produce a satisfactory crack-free weld. However, a 4 mil shim (0.004 inch) proved satisfactory in producing the triplet assembly of FIG. 2. Adequate welds can be obtained with iron-base shims ranging in thickness from about 0.002 inch to about 0.01 inch. Cold-rolled steel shim stock is preferred in that (due to its stiffness) it can be readily handled in an assembly without mechanical deformation prior to welding.

Analysis of the weld (microprobe analysis) of the nominal nickel-base alloy produced from steel shim stock containing at least 98% Fe (also some Mn and Si) and less than 0.1% carbon, showed the following composition by weight:

62.2 w/o Ni 6.1 w/o Cr 6.7 w/o Fe 6.3 w/o Al and the balance Co, Mo, Ta, Ti and residuals. For example, the dilution effect of using a low carbon steel shim in forming the desired weld with the aforementioned nominal composition may result in a weld composition containing about 7.4% Cr, 9.3% Co, 5.6% Mo, 5.6% Al, 0.9% Ti, 3.7% Ta, 7% Fe, about 1% Hf, and 59.5% Ni. When using a low carbon steel shim containing at least about 98% iron and the balance residuals, such as Mn, Si, and other elements, the amount of iron in the crack-free weld may range from about 5% to 10% by weight.

In welding the triplet shown in FIG. 2, the electron beam welding parameters used in welding the aforementioned nominal composition using a low carbon steel shim of the SAE 1010 type are as follows:

Voltage (kv. 22
Current (ma.) 50
Welding Speed Y Axis 54 ipm (inches per minute)
Welding Speed X Axis 45 i.p.m. (inches per minute)
Focus 5.65 a.
Distance 6 inches Details as to electron beam welding are well known and disclosed in various publications, such as in the "Welding Journal," June 1970 Edition, Welding Research Supplement, p. 259-S to 266-S (Published by American Welding Society).

Thermal cycling of electron beam welds produced with the steel shim showed good thermal fatigue strength. For example, no cracking was induced during 15 rapid air quench cycles from 1,600° F. to room temperature. It is not normal to consider using a steel shim in the electron beam welding of nickel-base alloys of the type disclosed herein; the normal practice points towards using nickel-base shims. However, tests have shown that nickel-base shims do not prevent cracking of electron beam produced welds. To this extent, the results obtained with steel shims are totally and surprisingly unexpected.

The invention is particularly applicable to the electron beam welding of guide vanes of the type shown in FIG. 2, the guide vanes comprising an airfoil section 15 connected at each end to buttresses 13 and 14, the buttresses being characterized by platform faces (adjacent welds 11 and 12) by means of which the guide vanes are assembled together and then electron beam welded, low carbon steel shims being advantageously used disposed between the abutting platform faces of the buttresses.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for producing a crack-free weld by the electron beam welding of at least a pair of heat resistant structural elements consisting essentially of a heat-resistant nickel-base alloy containing by weight about 5% to 12% Cr, about 3% to 8% Mo, about 2.3% to 10% Ta, the combined Mo and Ta content ranging from about 5% to 14%, about 5% to 15.5% Co, up to about 7% Ti, up to about 8% Al, the combined Ti and Al content ranging from about 5% to 9%, up to about 0.3% C, up to about 0.05% B, up to about 1% Zr, up to about 2% Hf, up to about 2% Fe and the balance essentially nickel which comprises, providing said at least one pair of structural elements of said nickel-base alloy, assembling said elements with selected surfaces thereof in abutting welding relationship with a low carbon iron-base shim disposed between said abutting surfaces, and then electron beam welding said elements into a unitary structure by the electron beam melting of the iron-base shim at the abutting surfaces of said elements, whereby a narrow crack-free weld is obtained formed as an alloy of said nickel-base alloy with said iron-base shim elements.

2. The method of claim 1, wherein the nickel-base alloy of the structural elements being welded is selected from the group consisting of by weight (A) about 7.5% to 12% Cr, about 3% to 8% Mo, about 1.3% to 10% Ta, the combined Mo and Ta content ranging from about 7% to 13%, about 5% to 10.5% Co, up to about 2.5% Ti, about 5% to 7% Al, the combined Ti and Al content ranging from about 5.5% to 8%, up to about 0.2% C, up to about 0.05% B, up to about 1% Zr, up to about 2% Hf, up to about 2% Fe and the balance essentially Ni; and (B) about 7.5% to 8.5% Cr, about 5.75% to 6.25% Mo, about 4% to 4.5% Ta, about 9.5% to 10.5% Co, about 0.8% to 1.2% Ti, about 5.75% to 6.25% Al, about 0.08% to 0.15% C, about 0.01% to 0.02% B, about 0.05% to 0.1% Zr, up to about 0.5% Fe, about 0.1% to 2% Hf, and the balance essentially nickel.

3. The method of claim 1, wherein the iron-base shim is a steel containing at least about 95% iron.

4. The method of claim 2, wherein the nickel-base alloy comprises about 8% Cr, about 6% Mo, about 4.3% Ta, about 10% Co, about 6% Al about 1% Ti, about 0.015% B, about 0.08% Zr, about 1% to 1.5% Hf and the balance essentially nickel.

5. A method for producing a crack-free weld by the electron beam welding of at least a pair of heat resistant jet engine guide vanes characterized by an airfoil section connected via their ends to buttresses having platform faces by means of which one guide vane can be welded to the other, the guide vanes consisting essentially of a heat resistant nickel-base alloy containing by weight about 5% to 12% Cr, about 3% to 8% Mo, about 2.3% to 10% Ta, the combined Mo and Ta content ranging from about 5% to 14%, about 5% to 15.5% Co, up to about 7% Ti, up to about 8% Al the combined Ti and Al content ranging from about 5% to 9%, up to about 0.3% C, up to about 0.05% B, up to about 1% Zr, up to about 2% Hf, up to about 2% Fe and the balance essentially nickel which comprises, providing said at least one pair of said guide vanes of said nickel-base alloy, assembling said guide vanes with selected platform faces thereof in abutting welding relationship with and iron-base shim disposed between said abutting surfaces, and then electron beam welding said elements into a unitary structure by the electron beam melting of the iron-base shim at the abutting faces of said buttresses, whereby a narrow crack-free weld is obtained formed as an alloy of said nickel-base alloy with said iron-base shim.

6. The method of claim 5, wherein the nickel-base alloy of the structural elements being welded is selected from the group consisting of by weight (A) about 7.5% to 12% Cr, about 3% to 8% Mo, about 2.3% to 10% Ta, the combined Mo and Ta content ranging from about 7% to 13%, about 5% to 10.5% Co, up to about 2.5% Ti, about 5% to 7% Al the combined Ti and Al content ranging from about 5.5% to 8%, up to about 0.2% C, up to about 0.05% B, up to about 1% Zr, up to about 2% Hf, up to about 2% Fe and the balance essentially Ni; and (B) about 7.5% to 8.5% Cr, about 5.75% to 6.25% Mo, about 4% to 4.5% Ta, about 9.5% to 10.5% Co, about 0.8% to 1.2% Ti, about 5.75% to 6.25% Al about 0.08% to 0.15% C, about 0.01% to 0.02% B, about 0.05% to 0.1% Zr, up to about 0.5% Fe, about 0.1% to 2% Hf, and the balance essentially nickel.

7. The method of claim 5, wherein the iron-base shim is a steel containing at least about 95% iron.

8. The method of claim 6, wherein the nickel-base alloy comprises about 8% Cr, about 6% Mo, about 4.3% Ta, about 10% Co, about 6% Al about 1% Ti, about 0.015% B, about 0.08% Zr, about 1% to 1.5% Hf and the balance essentially nickel.

* * * * *